(12) United States Patent
Park et al.

(10) Patent No.: US 10,662,305 B2
(45) Date of Patent: May 26, 2020

(54) PLASTIC FILM

(71) Applicant: LG CHEM, LTD., Seoul (KR)

(72) Inventors: Jin Young Park, Daejeon (KR); Jung Hwan Yoon, Daejeon (KR); Yeong Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/748,840

(22) PCT Filed: Sep. 30, 2016

(86) PCT No.: PCT/KR2016/010990
§ 371 (c)(1),
(2) Date: Jan. 30, 2018

(87) PCT Pub. No.: WO2017/057958
PCT Pub. Date: Apr. 6, 2017

(65) Prior Publication Data
US 2018/0215883 A1 Aug. 2, 2018

(30) Foreign Application Priority Data

Sep. 30, 2015 (KR) .......................... 10-2015-0137719
Sep. 29, 2016 (KR) .......................... 10-2016-0125892

(51) Int. Cl.
C08J 7/04 (2020.01)
(52) U.S. Cl.
CPC .......... *C08J 7/0423* (2020.01); *C08J 2367/02* (2013.01); *C08J 2433/14* (2013.01); *C08J 2435/02* (2013.01)
(58) Field of Classification Search
None
See application file for complete search history.

(56) References Cited

U.S. PATENT DOCUMENTS

| 6,489,015 | B1 | 12/2002 | Tsuchiya et al. | |
|---|---|---|---|---|
| 8,092,872 | B2 | 1/2012 | Kondo et al. | |
| 8,754,145 | B1 | 6/2014 | Haubrich et al. | |
| 9,403,991 | B2 | 8/2016 | Kang et al. | |
| 2003/0072895 | A1 | 4/2003 | Sakakura et al. | |
| 2004/0195967 | A1* | 10/2004 | Padiyath | B32B 27/08 313/512 |
| 2008/0081205 | A1* | 4/2008 | Agata | B32B 15/08 428/500 |
| 2008/0131674 | A1* | 6/2008 | Kondo | C09D 175/16 428/212 |
| 2009/0075074 | A1* | 3/2009 | Horio | C09D 4/00 428/341 |
| 2013/0164543 | A1* | 6/2013 | Shibuya | G06F 1/1643 428/428 |
| 2015/0132552 | A1 | 5/2015 | Kang et al. | |
| 2015/0148443 | A1 | 5/2015 | Kang et al. | |
| 2015/0166750 | A1 | 6/2015 | Kang et al. | |
| 2015/0175808 | A1 | 6/2015 | Kang et al. | |
| 2015/0225598 | A1 | 8/2015 | Kang et al. | |
| 2015/0299505 | A1 | 10/2015 | Kang et al. | |
| 2016/0024330 | A1 | 1/2016 | Jung et al. | |
| 2016/0282902 | A1 | 9/2016 | Kang et al. | |
| 2016/0297178 | A1 | 10/2016 | Kang et al. | |
| 2016/0304737 | A1 | 10/2016 | Kang et al. | |
| 2017/0036242 | A1* | 2/2017 | Lee | B05D 1/005 |

FOREIGN PATENT DOCUMENTS

| JP | 10-249988 A | 9/1998 |
|---|---|---|
| JP | 2003-335983 A | 11/2003 |
| JP | 2004-345223 A | 12/2004 |
| JP | 3751922 B2 | 3/2006 |
| JP | 2008-165205 A | 7/2008 |
| JP | 1574766 B2 | 11/2010 |
| JP | 4589128 B2 | 12/2010 |
| JP | 2011-075705 A | 4/2011 |
| JP | 2013-056432 A | 3/2013 |
| JP | 2013-107382 A | 6/2013 |
| JP | 5320848 B2 | 10/2013 |
| JP | 5676174 B2 | 2/2015 |
| KR | 10-0550377 B1 | 2/2006 |
| KR | 10-2013-0074830 A | 7/2013 |
| KR | 10-2013-0135151 A | 12/2013 |
| KR | 10-2014-0027023 A | 3/2014 |
| KR | 10-2014-0114292 A | 9/2014 |
| KR | 10-2015-0058066 A | 5/2015 |
| KR | 10-2015-0058067 A | 5/2015 |
| KR | 10-2015-0097569 A | 8/2015 |
| WO | 2013/038718 A1 | 3/2015 |

OTHER PUBLICATIONS

Search Report & Written Opinion issued for International Application PCT/KR2016/010990, dated Jan. 9, 2017 (13 pages).

* cited by examiner

*Primary Examiner* — Sheeba Ahmed
(74) *Attorney, Agent, or Firm* — Rothwell, Figg, Ernst & Manbeck, P.C.

(57) ABSTRACT

The present invention relates to a plastic film, and more specifically to a plastic film having excellent flexibility while exhibiting high hardness. According to the present invention, the plastic film exhibits flexibility, bending property, high hardness, scratch resistance and high transparency, despite its thin thickness, and hardly has a risk of damaging the film even in repeated, continuous bending or long-time folding state, and thereby can be usefully applied to flexible mobile devices, display devices, front face and display unit of various instrument panels, and the like.

18 Claims, 1 Drawing Sheet

[FIG. 1]
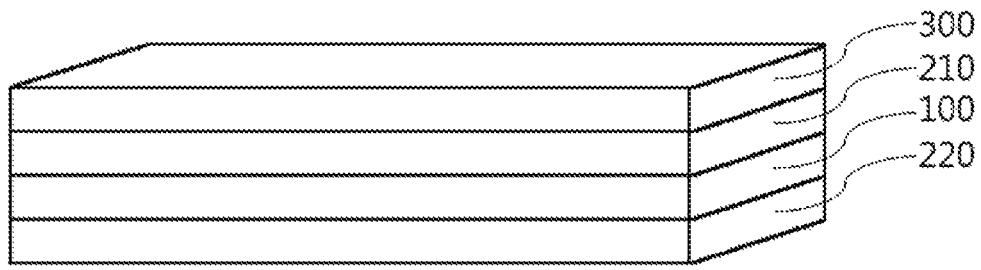
[FIG. 2]
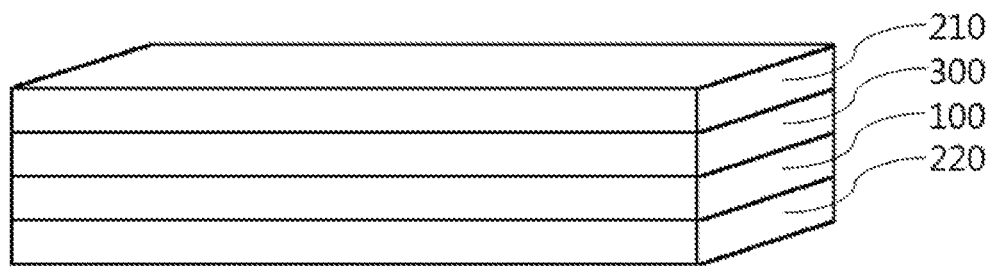
[FIG. 3]
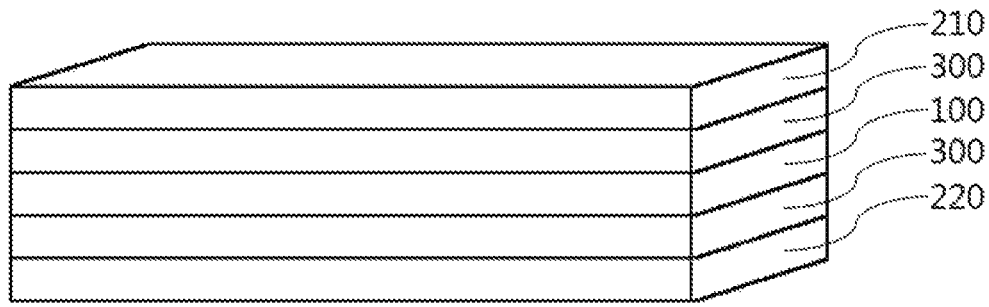

PLASTIC FILM

CROSS-REFERENCE TO RELATED APPLICATION(S)

The present application is a 35 U.S.C. 371 National Phase Entry Application from PCT/KR2016/010990, filed Sep. 30, 2016, which claims the benefit of priority based on Korean Patent Application No. 10-2015-0137719 filed on Sep. 30, 2015 and Korean Patent Application No. 10-2016-0125892 filed on Sep. 29, 2016 with the Korean Intellectual Property Office, the disclosures of which are incorporated herein by reference in their entirety.

TECHNICAL FIELD

The present invention relates to a plastic film. More specifically, the present invention relates to a multilayer plastic film exhibiting high hardness and excellent optical properties.

BACKGROUND ART

Recently, with the development of mobile devices such as smartphones and tablet PCs, thinning and slimming of substrates for display are required. Glass or tempered glass is commonly used as a material having excellent mechanical properties on windows or front boards for displays of mobile devices. However, the glass causes the weight increase of the mobile devices due to its own weight, and has a problem of breakage due to an external impact.

Therefore, plastic resin is being studied as a substitute for glass. The plastic resin composition is lightweight but hardly has a risk of cracking and thus are suitable for the trend of pursuing lighter mobile devices. In particular, in order to achieve a composition having high hardness and abrasion resistance properties, a composition for coating a hard coating layer onto a support substrate has been proposed.

As a method of improving the surface hardness of the hard coating layer, a method of increasing the thickness of the hard coating layer can be considered. In order to ensure the surface hardness enough to replace the glass, it is necessary to implement a thickness of a certain hard coating layer. However, as the thickness of the hard coating layer is increased, the surface hardness may be increased but the occurrence of wrinkles and curls are increased due to curing shrinkage of the hard coating layer, and at the same time cracking and peeling of the coat layer are likely to occur. Therefore, the practical application of this method is not easy.

Meanwhile, a display in which a part of the display device is bent or flexibly warped for aesthetic and functional reasons has recently been attracting attention, and this tendency is particularly noticeable in mobile devices such as smartphones and tablet PCs. However, since glass is not suitable for use as a cover plate for protecting such a flexible display, it needs to be replaced with a plastic resin or the like. However, for that purpose, it is not easy to produce a thin film having sufficient flexibility while exhibiting a glass level of high hardness.

DETAILED DESCRIPTION OF THE INVENTION

Technical Problem

It is an object of the present invention to provide a plastic film having excellent flexibility while being able to exhibit high hardness even when formed in a thin thickness.

Technical Solution

In accordance with one aspect of the present invention, there is provided a plastic film comprising: a substrate; a first hard coating layer formed on one surface of the substrate and including a cured product of a multifunctional acrylate-based binder and a multifunctional urethane acrylate-based binder; and an inorganic oxide sputtering layer formed on the first hard coating layer and having a thickness of 5 nm to 700 nm.

In accordance with another aspect of the present invention, there is provided a plastic film comprising: a substrate; an inorganic oxide sputtering layer formed on one surface of the substrate and having a thickness of 5 nm to 700 nm; and a first hard coating layer formed on the inorganic oxide sputtering layer and including a cured product of a multifunctional acrylate-based binder and a multifunctional urethane acrylate-based binder.

Advantageous Effects

The plastic film according to the present invention exhibits flexibility, bending property, high hardness, scratch resistance and high transparency, and the damage of the film is small even in repeated, continuous bending or long-time folding state. Therefore, the plastic film can be usefully applied to bendable, flexible, rollable or foldable mobile devices, display devices, front face and display unit of various instrument panels, and the like.

BRIEF DESCRIPTION OF DRAWINGS

FIG. 1 is a view illustrating a plastic film according to an embodiment of the present invention.

FIG. 2 is a view illustrating a plastic film according to an embodiment of the present invention.

FIG. 3 is a view illustrating a plastic film according to an embodiment of the present invention.

DETAILED DESCRIPTION OF THE EMBODIMENTS

The plastic film of the present invention comprises: a substrate; a first hard coating layer formed on one surface of the substrate and including a cured product of a multifunctional acrylate-based binder and a multifunctional urethane acrylate-based binder; and an inorganic oxide sputtering layer formed on the first hard coating layer and having a thickness of 5 nm to 700 nm.

In the present invention, the terms such as first, second, etc. are used to describe various components, and the terms are used only for the purpose of distinguishing one component from another component.

Moreover, the terminology used herein is for the purpose of describing exemplary embodiments only and is not intended to limit the present invention. The singular expression includes plural expressions unless the context clearly indicates otherwise. It will be understood that the terms such as "comprise," "include," "have," etc. as used herein specify the presence of stated features, integers, steps, components, or combinations thereof but do not preclude the presence or addition of one or more other features, integers, steps, components, and/or combinations thereof.

In the present invention, the term "upper surface" means a surface arranged to face a viewer when the plastic film of the present invention is attached to a device such as a liquid crystal display. And the term "upper" means a direction directed toward a viewer when the plastic film is attached to the device. Conversely, the term "lower surface" or "lower" refers to a surface or direction arranged to face a side opposite to a viewer when the plastic film is attached to the device.

As the present invention allows for various changes and numerous embodiments, particular embodiments will be illustrated and described in detail below. However, this is not intended to limit the present invention to particular modes of practice, and it is to be appreciated that all changes, equivalents, and substitutes that do not depart from the spirit and technical scope of the present invention are encompassed in the present invention.

Throughout the present specification, the inorganic oxide sputtering layer means a high hardness inorganic oxide layer formed on the substrate or the first hard coating layer by sputter deposition using an inorganic target element.

That is, it refers to a layer formed by depositing an inorganic oxide on the substrate or the first hard coating layer through a method in which the inorganic element, which is a precursor of the inorganic oxide, is directly placed on the substrate or the first hard coating layer, and then a voltage is applied to generate a plasma and oxygen gas is injected therein, and also refers to a layer not containing a separate binder or fine particles for curing or hardness improvement within the layer.

Hereinafter, the plastic film of the present invention will be described in more detail. According to an aspect of the invention, there is provided a plastic film comprising: a substrate; a first hard coating layer formed on one surface of the substrate and including a cured product of a multifunctional acrylate-based binder and a multifunctional urethane acrylate-based binder; and an inorganic oxide sputtering layer formed on the first hard coating layer and having a thickness of 5 nm to 700 nm.

In accordance with another aspect of the present invention, there is provided a plastic film comprising: a substrate; an inorganic oxide sputtering layer formed on one surface of the substrate and having a thickness of 5 nm to 700 nm; and a first hard coating layer formed on the inorganic oxide sputtering layer and including a cured product of a multifunctional acrylate-based binder and a multifunctional urethane acrylate-based binder.

The plastic film used for the cover plastic for display or the like is disposed at the outermost position of the display, and so high hardness and scratch resistance are required. In addition, when a thick substrate is generally used and the thickness of the protective coating layer is increased, the high hardness can be easily realized. However, due to the slimming, thinning, and curving tendency of the display device, the film itself also needs to be thinned Thus, it is necessary to maintain mechanical properties such as high hardness, scratch resistance, and flexibility while having a thin thickness.

Accordingly, the plastic film according to one aspect of the present invention comprises: a substrate; a first hard coating layer formed on one surface of the substrate and including a cured product of a multifunctional acrylate-based binder and a multifunctional urethane acrylate-based binder; and an inorganic oxide sputtering layer formed on the first hard coating layer and having a thickness of 5 nm to 700 nm.

In addition, the plastic film according to another aspect of the present invention comprises: a substrate; an inorganic oxide sputtering layer formed on one surface of the substrate and having a thickness of 5 nm to 700 nm; and a first hard coating layer formed on the inorganic oxide sputtering layer.

The substrate may be, for example, a film including polyimide (PTPI), polyimideamide, polyetherimide (PEI), polyethyleneterephtalate (PET), polyethylenenaphthalate (PEN), polyetheretherketone (PEEK), cyclic olefin polymer (COP), polyacrylate (PAC), polymethylmethacrylate (PMMA), triacetylcellulose (TAC), and the like.

The above substrate may have a single layer or a multilayer structure including, if necessary, two or more substrates composed of the same as or different substances, and is not particularly limited.

The thickness of the support substrate is not particularly limited, but it is desirable to use a substrate having a thickness of about 5 μm to about 150 μm, or about 10 μm to about 100 μm.

Further, the plastic film of the present invention comprises a first hard coating layer. The first hard coating layer may be formed to be in direct contact with one surface of the substrate or may be formed to further include a structure such as another layer or a film between the first hard coating layer and the support substrate. Further, it is desirable that the first hard coating layer has a thickness of about 0.5 μm to about 20 μm or about 1 μm to 10 μm.

Further, the plastic film of the present invention includes an inorganic oxide sputtering layer having a thickness of 5 nm to 700 nm.

The inorganic oxide sputtering layer may be a layer formed by the above-described sputter deposition, and have a shape which is formed in direct contact with the substrate, or formed in direct contact with the first hard coating layer formed on the substrate.

Generally, in the case of the plastic film or the like used for protecting a display, in order to increase the hardness of the film or achieve an optical effect such as antiglare, a method of mixing an inorganic oxide such as silica with a composition for forming a coating layer in the form of nanoparticles or micro-particles, coating such composition onto the substrate and curing it is used However, the plastic film according to one embodiment of the present invention includes an inorganic oxide sputtering layer formed by a vacuum deposition method, and the inorganic oxide sputtering layer is formed to have a thickness in the range of 5 nm to 700 nm, preferably in the range of about 10 nm to about 500 nm, or in the range of about 50 nm to about 150 nm, that is, to have a nanoscale thickness that is relatively thinner than that of a general coating layer. Accordingly, a further thinned display device can be easily implemented, it can be applied even to a display device in the form of a curved type or a flexible type, and it becomes possible to realize high hardness despite its thin thickness.

In particular, such inorganic oxide sputtering layer can form a higher density and a stronger film than the hard coating layer formed by conventional methods such as photo-curing or heat-curing, and so it becomes possible to exhibit a high hardness despite its thin thickness.

According to an embodiment of the present invention, the plastic film may further comprise a second hard coating layer formed on an opposite surface to the substrate on which the first hard coating layer is formed and including a cured product of a multifunctional acrylate-based binder and a multifunctional urethane acrylate-based binder. That is, the plastic film can be implemented in the shape in which the first and second hard coating layers are respectively formed on both surfaces of the substrate, and it may be formed in a state in which the substrate, the first and second hard coating layers are respectively in direct contact with each other, or may be formed in a state in which another layer or another element may be additionally interposed between the first hard coating layer and the second hard coating layer.

In this case, the second hard coating layer may be formed to have a thickness of about 0.5 µm to about 40 µm or about 1 µm to about 30 µm, which may be appropriately adjusted for the flatness of the plastic film.

Further, it may be desirable that the inorganic oxide sputtering layer may be formed on the uppermost surface of the plastic film. That is, when the plastic film of the present invention is equipped with a device such as a liquid crystal display, the inorganic oxide sputtering layer included in the plastic film is arranged to face a viewer. Furthermore, it may be advantageous from the viewpoint of realizing high hardness that that no more layers or elements are formed on the upper portion of the inorganic oxide sputtering layer.

FIG. 1 is a view illustrating a plastic film according to an embodiment of the present invention.

Referring to FIG. 1, it can be confirmed that the structure of the plastic film includes a substrate 100; a first hard coating layer 210 formed on one surface of the substrate 100; and an inorganic oxide sputtering layer 300 having a thickness of 5 nm to 700 nm. In addition, it can be confirmed that a structure of the plastic film is configured such that a second hard coating layer 220 is formed on the lower surface of the substrate 100.

FIG. 2 is a view illustrating a plastic film according to another embodiment of the present invention.

Referring to FIG. 2, it can be specifically confirmed that the structure of the plastic film includes a substrate 100; an inorganic oxide sputtering layer 300 formed on one surface of the substrate and having a thickness of 5 nm to 700 nm; and a first hard coating layer 210 formed on the inorganic oxide sputtering layer 300. In addition, it can be confirmed that a structure of the plastic film is configured such that a second hard coating layer 220 is formed on the lower surface of the substrate 100.

FIG. 3 is a view illustrating a plastic film according to another embodiment of the present invention.

Referring to FIG. 3, it can be confirmed that the plastic film comprises a substrate 100; an inorganic oxide sputtering layer 300 formed on one surface of the substrate and having a thickness of 5 nm to 700 nm; and a first hard coating layer 210 formed on the inorganic oxide sputtering layer 300; and a second hard coating layer 220 formed on the lower surface of the substrate, wherein the plastic film has structure in which another inorganic oxide sputtering layer 300 is interposed between the substrate and the second hard coating layer.

In the plastic film of the present invention, the first hard coating layer and the second hard coating layer may be each independently the same as or different from each other, and may include a crosslinked copolymer of a 3- to 6-functional acrylate-based binder and a 7- to 20-functional urethane acrylate-based binder.

As used herein, the acrylate-based means not only acrylate but also methacrylate, or derivatives in which a substituents are introduced into acrylate or methacrylate.

The 3- to 6-functional acrylate-based binder is cross-linked with the 7- to 20-functional urethane acrylate-based binder to form a copolymer, and can impart high hardness to the coating layer formed after curing.

More specifically, the 3- to 6-functional acrylate-based binder may include trimethylolpropane triacrylate (TMPTA), trimethylolpropaneethoxy triacrylate (TMPEOTA), glycerin propoxylated triacrylate (GPTA), pentaerythritol tetraacrylate (PETA), dipentaerythritol hexaacrylate (DPHA), and the like. The above-mentioned 3- to 6-functional acrylate binder may be used alone or in combination of different types.

According to one embodiment of the present invention, the 3- to 6-functional acrylate-based binder has a weight average molecular weight (Mw) ranging from about 200 to about 2,000 g/mol, or about 200 to about 1,000 g/mol, or about 200 to about 500 g/mol.

According to another embodiment of the present invention, the 3- to 6-functional acrylate-based binder has an acrylate equivalent weight ranging from about 50 to about 300 g/mol, or about 50 to about 200 g/mol, or about 50 to about 150 g/mol.

When the weight average molecular weight and the acrylate equivalent of the 3- to 6-functional acrylate-based binder are respectively within the above-mentioned ranges, a coating layer having more optimized physical properties can be formed.

The 7- to 20-functional urethane acrylate-based binder is cross-linked with the 3- to 6-functional acrylate-based binder to form a copolymer, and may impart high hardness, flexibility and impact resistance to the coating layer formed after curing. The 7- to 20-functional urethane acrylate-based binder may be used alone or in combination of different types.

According to an embodiment of the present invention, the 7- to 20-functional urethane acrylate-based binder may be used in combination of different types. For example, a 7- to 9-functional urethane acrylate-based binder and a 10- to 20-functional urethane acrylate-based binder can be mixed and used. As described above, as multifunctional urethane acrylate-based binder having different numbers of functional groups are mixed and used, it forms various types of crosslinks with acrylate-based binders and thus impart high hardness, flexibility, impact resistance to the coating layer formed after curing. Further, it becomes possible to secure excellent adhesion with the inorganic oxide sputtering layer formed on the hard coating layer. In this case, the weight ratio between the 7- to 9-functional urethane acrylate-based binder and the 10- to 20-functional urethane acrylate-based binder may be from about 7:3 to about 5:5, or from about 7:3 to 6:4.

According to one embodiment of the present invention, the 7- to 20-functional urethane acrylate-based binder having a weight average molecular weight of about 2,000 to about 8,000 g/mol, or about 3,000 to about 6,000 g/mol, or about 3,000 to about 5,000 g/mol may be preferable to optimize the physical properties of the coating layer.

According to an embodiment of the present invention, the 7- to 20-functional urethane acrylate-based binder may have an acrylate equivalent weight of about 200 to about 1,500 g/mol, or about 200 to about 1,000 g/mol, or about 300 to about 600 g/mol, or about 300 to about 500 g/mol. If the acrylate equivalent weight of the 7- to 20-functional urethane acrylate-based binder is too high, the hardness of the coating layer may be insufficient, and if the equivalent weight is too low, the hardness may be improved but the flexibility may be deteriorated. From the viewpoint of balance between high hardness and flexibility as described above, the above-mentioned range of equivalent weight is preferable, and about 300 to about 500 g/mol may be most preferable.

When the weight average molecular weight and the acrylate equivalent weight of the 7- to 20-functional urethane acrylate-based binder are respectively within the ranges described above, coating layers having more optimized properties can be formed.

As the 7- to 20-functional urethane acrylate-based binder contains in the molecule at least 7 acrylate groups capable of performing a crosslinking polymerization by ultraviolet rays, it is advantageous for achieving high hardness of the coating layer. However, the higher the cross-linking density, it allows the curls to be easily generated and the adhesive force with the substrate is lowered, and so it is not suitable for forming a flexible film.

Meanwhile, the 7- to 20-functional urethane acrylate-based binder contained in the coating layer of the present invention includes at least 7 multifunctional acrylate groups and at the same time has a urethane bond in the molecule, and thus is excellent in elasticity and flexibility. Accordingly, when it is cross-linked with a 3- to 6-functional acrylate binder at an appropriate weight ratio to form a copolymer, it serves to impart sufficient flexibility together with high hardness to the coating layer. The 7- to 20-functional urethane acrylate-based binder may contain 2 to 20 urethane bonds in one molecule.

As such, the coating layer of the present invention includes a crosslinked copolymer in which the 3- to 6-functional acrylate-based binder and the 7 to 20-functional urethane acrylate-based binder are crosslinked to each other, thereby imparting high hardness and flexibility to the plastic film. In particular, it has high durability to bending, rolling or folding, and thus it is possible to secure excellent flexibility, which hardly has a risk of damaging the film even when repeatedly warped or folded for a long time.

Generally, the hard coating layer used for protecting the display is used by incorporating inorganic fine particles such as silica nanoparticles into a binder component such as acrylate in order to improve the mechanical properties such as hardness.

However, since the plastic film according to one aspect of the present invention has the inorganic oxide sputtering layer, it is possible to avoid using separate inorganic fine particles in the first hard coating layer and the second hard coating layer. Thus, it is possible to further simplify the manufacturing process and also to prevent a haze phenomenon or the like which may occur due to the use of silica nanoparticles or the like.

That is, in order to improve the hardness, nanosized inorganic fine particles and the like can be included in the first hard coating layer and the second hard coating layer. However, even if these inorganic fine particles are not used, it is possible to provide a plastic film having thin thickness and high flexibility while having sufficient hardness.

As the inorganic fine particles, for example, silica fine particles, aluminum oxide particles, titanium oxide particles, zinc oxide particles, or the like can be used independently.

Meanwhile, the first and second coating layers of the present invention may further include additives commonly used in the art, such as a surfactant, an anti-yellowing agent, a leveling agent, an antifouling agent, etc., in addition to the above-mentioned crosslinked copolymer and inorganic fine particles. Further, the content thereof is not particularly limited as it can be variously adjusted within the range that does not deteriorate the physical properties of the plastic film of the present invention. However, they may be contained in an amount of about 0.1 to 100 parts by weight based on about 100 parts by weight of the crosslinked copolymer.

According to an embodiment of the present invention, for example, the first and second coating layers may contain a surfactant as an additive, and the surfactant may be a mono- or bi-functional fluorine-based acrylate, a fluorine-based surfactant, or a silicon-based surfactant. In this case, the surfactant may be dispersed or crosslinked in the crosslinked copolymer.

Further, the additive may include an anti-yellowing agent, and examples of the anti-yellowing agent include a benzophenone-based compound or a benzotriazole-based compound.

The first and second coating layers of the present invention as described above are each independently the same as or different from each other, and may be formed by photo-curing a coating composition in which a 3- to 6-functional acrylate-based binder; a 7- to 20-functional urethane acrylate-based binder; photoinitiator; and optionally inorganic microparticles; and an additive are mixed with an organic solvent.

Examples of the photoinitiator may include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, $\alpha,\alpha$-dimethoxy-$\alpha$-phenylacetophenone, 2-benzoyl-2-(dimethylamino)-1-[4-(4-morpholinyl)phenyl]-1-butanone, 2-methyl-1-[4-(methylthio) phenyl]-2-(4-morpholinyl)-1-propanone diphenyl(2,4,6-trimethylbenzoyl)-phosphine oxide, or bis(2,4,6-trimethylbenzoyl)-phenylphosphine oxide, and the like, but are not limited thereto. In addition, examples of commercially available products include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators can be used alone or in combination of two or more.

Examples of the organic solvent include alcohol based solvents such as methanol, ethanol, isopropyl alcohol and butanol; alkoxy alcohol based solvents such as 2-methoxy-ethanol, 2-ethoxyethanol and 1-methoxy-2-propanol; ketone based solvents such as acetone, methyl ethyl ketone, methyl isobutyl ketone, methyl propyl ketone and cyclohexanone; ether based solvent such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether and diethylene glycol-2-ethylhexyl ether; aromatic solvent such as benzene, toluene and xylene, and the like. These may be used alone or in combination.

The content of the organic solvent is not particularly limited since it can be variously adjusted within a range that does not deteriorate the physical properties of the coating composition, but it can included so that the weight ratio of the solid content:organic solvent is about 30:70 to about 99:1 based on the solid content of the components contained in the coating composition. When the organic solvent is within the above range, it can have appropriate fluidity and coating performance.

The coating composition may be sequentially coated onto the front and rear surfaces of the support substrate, or simultaneously coated onto both surfaces of the support substrate.

According to one embodiment of the present invention, the coating composition comprising the above-described components is coated onto one surface or both surfaces of the support substrate and then photo-cured to form a first and/or a second coating layer, thereby obtaining the plastic film of the present invention. Here, the method of coating the coating composition is not particularly limited as long as it can be used in the technical field to which the present technology belongs, and for example, a bar coating method, a knife coating method, a roll coating method, a blade coating method, a die coating method, a micro gravure coating method, a comma coating method, a slot die coating method, a lip coating method, a solution casting method, or the like can be used.

The inorganic oxide sputtering layer included in the plastic of the present invention may include silicon oxide, aluminum oxide, titanium oxide, or a mixture thereof. The inorganic oxide sputtering layer may be formed on one surface or both surfaces of the substrate or formed on one surface of the substrate by a vacuum deposition method.

For example, when the first hard coating layer is formed on the upper surface of the substrate and the inorganic oxide sputtering layer is formed on the uppermost surface of the plastic film, a coating composition for forming the first hard coating layer can be coated onto one surface of the substrate and photo-cured to form a first hard coating layer. After the first hard coating layer is moved into a sputtering chamber and the target inorganic elements (i.e., Si, Al, Ti) for the deposition of the inorganic oxide is positioned on one surface of the formed first hard coating layer, an inorganic oxide sputtered layer is formed by a method of applying a voltage while injecting oxygen gas into the sputtering chamber, thereby realizing a plastic film having the above-mentioned structure.

In the step of applying a voltage, an angle and a position between the first hard coating layer and the target inorganic element may be appropriately adjusted for plasma generation, and oxygen gas may be supplied simultaneously with or before or after voltage application, thereby forming an inorganic oxide sputtering layer. At this time, the power can be from about 200 W to about 500 W, and the pressure inside the sputtering chamber can be from about 2 mtorr to about 10 mtorr, and the oxygen gas can be supplied at a rate from about 5 sccm to about 20 sccm.

For example, in the case of a plastic film in which the first hard coating layer is formed on the upper surface of the substrate and the inorganic oxide sputtering layer is formed between the substrate and the first hard coating layer, after the substrate is moved into a sputtering chamber and the target inorganic elements (i.e., inorganic oxide precursors such as Si, Al, Ti) for the deposition of the inorganic oxide is positioned on one surface of the substrate, an inorganic oxide sputtering layer can be formed by a method of applying a voltage while injecting oxygen gas into the sputtering chamber. Then, the coating composition for forming the first hard coating layer can be coated onto the upper surface of the formed inorganic oxide sputtering layer and photo-cured to realize a plastic film having the above-mentioned structure.

In addition, in the case of a plastic film in which the first hard coating layer is formed on the upper surface of the substrate and the inorganic oxide sputtering layer is formed on the lower surface of the substrate and between the substrate and the first hard coating layer, after the substrate is moved into a sputtering chamber and the target inorganic elements (i.e., Si, Al, Ti) for the deposition of the inorganic oxide is positioned on both surfaces of the substrate, an inorganic oxide sputtering layer can be formed by a method of applying a voltage while injecting oxygen gas into the sputtering chamber. Then, the coating composition for forming the first hard coating layer can be coated onto the upper surface of the inorganic oxide sputtering layer and photo-cured to realize a plastic film having the above-mentioned structure.

In addition, since the optical properties of the inorganic oxide sputtering layer can be changed depending on the target inorganic elements to be used, the thickness of the inorganic oxide sputtering layer to be formed, the processing condition, and the like can be appropriately adjusted when other target inorganic elements are used.

According to one embodiment of the present invention, the plastic film of the present invention may further include at least one selected from a layer, a membrane, a film or the like such as a plastic resin film, an adhesive film, a release film, a conductive film, a conductive layer, a liquid crystal layer, a coating layer, a cured resin layer, a non-conductive film, a metal mesh layer, a metal mesh layer or a patterned metal layer on at least one coating layer of the double-side coating layers. Further, the layer, membrane, film or the like may be in any form of a single layer, a double layer, or a laminate type. The layer, membrane, film or the like may be formed by laminating a freestanding film with an adhesive, a cohesive film, or the like, or may be laminated on the coating layer by a method such as coating, vapor deposition, sputtering, or the like, but the present invention is not limited thereto.

The plastic film of the present invention exhibits excellent flexibility, bending property, high hardness, scratch resistance, high transparency, durability and stability to bending, flexing or folding and thus can be used as a cover film of a next generation display having bendable, flexible, rollable or foldable properties, and the like.

For example, in the case of an ordinary plastic film, the flexibility decreases as the hardness increases. Nevertheless, the plastic film of the present invention, when subjected to a mandrel test, can exhibit flexibility to such an extent that cracks do not occur even when wound on a cylindrical mandrel with a diameter of 6 mm Therefore, the plastic film of the present invention can be widely used in fields requiring high hardness and flexibility.

Further, the plastic film of the present invention may have a high hardness and a pencil hardness of 1H or more, preferably 2H or more, under a load of 750 g.

Further, the plastic film of the present invention may have a light transmittance of 90% or more, preferably 92% or more, and a haze value of 1% or less, preferably 0.7% or less, more preferably 0.5% or less.

The plastic film of the present invention can be utilized in various fields. For example, the plastic film of the present invention can be used as a flat-shaped as well as a curved, bendable, flexible, rollable or foldable-shaped mobile communication terminal, a touch panel of a smartphone or a tablet PC, and cover substrates or element substrate of various displays.

Hereinafter, the operation and effect of the invention will be described in more detail by way of concrete examples. However, these examples are merely presented for illustrative purposes only, and the scope of the invention is not determined thereby.

EXAMPLES

Preparation of Coating Composition for Forming First Hard Coating Layer 30 g of trimethylolpropane triacrylate (TMPTA) (manufactured by Cytec, Mw=296 g/mol, acrylate group equivalent weight=99 g/mol) as a trifunctional acrylate binder, 40 g of MU9800 (manufactured by Miwon, Mw=4500 g/mol, acrylate group equivalent weight=389 g/mol) as a 9-functional urethane acrylate-based binder, 30 g of MU9020 (manufactured by Miwon, Mw=4500 g/mol, acrylate group equivalent weight=450 g/mol) as a 10-functional urethane acrylate-based binder, 1 g of Irgacure 184 (manufactured by Ciba) as a photo-initiator, and 50 g of methyl ethyl ketone (MEK) were mixed to prepare an acrylate solution. 20 g of Nanopol C764 (manufactured by Evonik) in which silica particles having a particle diameter of 20 nm were dispersed in PGMEA (propylene glycol monoester acetate) in an amount of 50% by weight was mixed with the resulting acrylate solution to prepare a coating composition.

Preparation of Coating Composition for Forming Second Hard Coating Layer 50 g of trimethylolpropane triacrylate (TMPTA) (manufactured by Cytec, Mw=296 g/mol, acrylate group equivalent weight=99 g/mol) as a trifunctional acrylate-based binder, 50 g of DPCA-120 (manufactured by Nippon Kayaku) as a 6-functional acrylate-based binder, 1 g of Irgacure 184 (manufactured by Ciba) as a photoinitiator and 50 g of methylethyl ketone (MEK) were mixed to prepare a coating composition.

Preparation of Plastic Film

Example 1

PET having a thickness of 50 μm was used as a substrate film.

A substrate film was placed in a sputtering chamber, and $SiO_2$ layer was deposited on one surface of the substrate. A voltage was applied to a Si target at a power of 300 W to form a plasma, and while oxygen gas was supplied at 10 sccm, the pressure inside the chamber was adjusted to 5 mtorr. The thickness of the deposited $SiO_2$ layer was 100 nm.

The first hard coating composition was coated by a bar coating method onto a film on which $SiO_2$ layer was deposited on an inorganic oxide sputtering layer and photo-cured with a metal halide lamp having a wavelength of about 290 to about 320 nm to form a first hard coating layer. After curing was completed, the thickness of the first hard coating layer formed was 10 μm.

A second hard coating layer was formed by coating and photo-curing the second hard coating composition on a surface opposite to the substrate film on which the first hard coating layer was formed, in the same manner as in the formation of the first hard coating layer. After the curing was completed, the thickness of the second hard coating layer formed was 30 μm.

Example 2

A plastic film was produced in the same manner as in Example 1 except that the thickness of the inorganic oxide sputtering layer was 300 nm.

Example 3

A plastic film was produced in the same manner as in Example 1 except that the thickness of the inorganic oxide sputtering layer was 500 nm.

Example 4

PET having a thickness of 50 μm was used as a substrate film.

The first hard coating composition was coated onto a substrate film by a bar coating method and photo-cured using a metal halide lamp having a wavelength of about 290 to about 320 nm to form a first hard coating layer. After the curing was completed, the thickness of the first hard coating layer formed was 10 μm.

A second hard coating composition was coated and photo-cured onto a surface opposite to the substrate film on which the first hard coating layer was formed, in the same manner as in the formation of the first hard coating layer. After the curing was completed, the thickness of the second hard coating layer formed was 30 μm.

A plastic film on which the first and second hard coating layers were formed was placed in a sputtering chamber, and $SiO_2$ layer was deposited on the upper surface of the first hard coating layer. A voltage was applied to the Si target at a power of 300 W to form a plasma, and while oxygen gas was supplied at 10 sccm, the pressure inside the chamber was adjusted to 5 mtorr. The thickness of the deposited $SiO_2$ layer was 10 nm.

Example 5

A plastic film was produced in the same manner as in Example 4 except that the thickness of the inorganic oxide sputtering layer was 20 nm.

Example 6

A plastic film was produced in the same manner as in Example 4 except that the thickness of the inorganic oxide sputtering layer was 50 nm.

Example 7

A plastic film was produced in the same manner as in Example 4 except that the thickness of the inorganic oxide sputtering layer was 75 nm.

Example 8

A plastic film was produced in the same manner as in Example 4 except that the thickness of the inorganic oxide sputtering layer was 100 nm.

Comparative Example 1

The first and second hard coating layers were formed on the substrate film in the same manner as in Example 1, without the inorganic oxide sputtering layer.

The structures and characteristics of the plastic films produced in the above Examples and Comparative Examples are summarized in Table 1 below.

TABLE 1

| | Inorganic oxide sputtering layer component | Inorganic oxide sputtering layer thickness (nm) | First hard coating layer (μm) | Second hard coating layer (μm) |
|---|---|---|---|---|
| Example 1 | SiO$_2$ | 100 | 10 | 30 |
| Example 2 | SiO$_2$ | 300 | 10 | 30 |
| Example 3 | SiO$_2$ | 500 | 10 | 30 |
| Example 4 | SiO$_2$ | 10 | 10 | 30 |
| Example 5 | SiO$_2$ | 20 | 10 | 30 |
| Example 6 | SiO$_2$ | 50 | 10 | 30 |
| Example 7 | SiO$_2$ | 75 | 10 | 30 |
| Example 8 | SiO$_2$ | 100 | 10 | 30 |
| Comparative Example 1 | N/A | N/A | 10 | 30 |

Experimental Example

<Measurement Method>
1) Pencil Hardness

The maximum hardness without scratches was confirmed after moving the pencil back and forth three times at an angle of 45 degrees under a load of 750 g using a pencil hardness tester in accordance with standard JIS K5400.

2) Transmittance and Haze

The transmittance and haze were measured using a spectrophotometer (apparatus name: COH-400).

3) Bending Test

Each film was interposed and wound between cylindrical mandrels of various diameters and then the minimum diameter at which no cracks occurred was measured.

The results of the above experiments are summarized in Table 2 below.

A plastic film was produced in the same manner as in Example 4 except that the thickness of the inorganic oxide sputtering layer was 100 nm.

TABLE 2

| | Pencil Hardness (750 gf) | Transmittance (%) | Haze (%) | Bending Test (Φ, mm) |
|---|---|---|---|---|
| Example 1 | 2H | 92.1 | 0.3 | 6 |
| Example 2 | 2H | 92.2 | 0.3 | 6 |
| Example 3 | 2H | 92.1 | 0.4 | 6 |
| Example 4 | 2H | 92.3 | 0.3 | 6 |
| Example 5 | 2H | 92.2 | 0.3 | 6 |
| Example 6 | 3H | 92.2 | 0.4 | 6 |
| Example 7 | 3H | 92.3 | 0.5 | 6 |
| Example 8 | 3H | 92.3 | 0.7 | 6 |
| Comparative Example 1 | H | 92.2 | 0.4 | 6 |

Referring to Table 2, it can be confirmed that in the case of the plastic film according to Examples of the present invention, although it has flexibility similar to that of a general acrylate curable plastic film, it exhibits a relatively higher pencil hardness due to separately formed inorganic oxide sputtering layer. It can be confirmed that optical properties such as transmittance and haze value are also excellent.

EXPLANATION OF SIGN

100: Substrate
210: First hard coating layer
220: Second hard coating layer
300: Inorganic oxide sputtering layer

The invention claimed is:

1. A plastic film comprising:
a substrate;
a first hard coating layer formed on one surface of the substrate and including a cured product of a 3- to 6-functional acrylate-based binder and a 7 to 20-functional urethane acrylate-based binder; and
an inorganic oxide sputtering layer formed on the first hard coating layer and having a thickness of 5 nm to 700 nm,
and
wherein cracks do not occur in the plastic film when wound on a mandrel with a diameter of 6 mm,
wherein the plastic film has a haze value of 0.5% or less,
and wherein the 7- to 20-functional urethane acrylate-based binder in the first hard coating layer includes a 7- to 9-functional urethane acrylate-based binder and a 10- to 20-functional urethane acrylate-based binder.

2. A plastic film comprising:
a substrate;
an inorganic oxide sputtering layer formed on one surface of the substrate and having a thickness of 5 nm to 700 nm; and
a first hard coating layer formed on the inorganic oxide sputtering layer and including a cured product of a 3- to 6-functional acrylate-based binder and a 7 to 20-functional urethane acrylate-based binder,
and
wherein cracks do not occur in the plastic film when wound on a mandrel with a diameter of 6 mm,
wherein the plastic film has a haze value of 0.5% or less,
and wherein the 7- to 20-functional urethane acrylate-based binder in the first hard coating layer includes a 7- to 9-functional urethane acrylate-based binder and a 10- to 20-functional urethane acrylate-based binder.

3. The plastic film according to claim 1, wherein the inorganic oxide sputtering layer includes silicon oxide, aluminum oxide, titanium oxide, or a mixture thereof.

4. The plastic film according to claim 1, further comprises a second hard coating layer formed on an opposite surface of the substrate on which the first hard coating layer is formed and including a cured product of a multifunctional acrylate-based binder and a multifunctional urethane acrylate-based binder.

5. The plastic film according to claim 4, wherein the first hard coating layer and the second hard coating layer are each independently the same as or different from each other, and wherein the second hard coating layer includes a crosslinked copolymer of a 3-to 6-functional acrylate-based binder and a 7- to 20-functional urethane acrylate-based binder.

6. The plastic film according to claim 5, wherein the 7- to 20-functional urethane acrylate-based binder in the second hard coating layer includes a 7- to 9-functional urethane acrylate-based binder and a 10- to 20-functional urethane acrylate-based binder.

7. The plastic film according to claim 5, wherein the 3- to 6-functional acrylate-based binder has an acrylate equivalent weight of 50 to 300 g/mol.

8. The plastic film according to claim 5, wherein the 3- to 6-functional acrylate-based binders includes at least one selected from the group consisting of trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

9. The plastic film according to claim 5, wherein the 7- to 20-functional urethane acrylate-based binder has an acrylate equivalent weight of 200 to 1,500 g/mol.

10. The plastic film according to claim 1, wherein the plastic film exhibits a pencil hardness of 1H or more under a load of 750 g.

11. The plastic film according to claim 2, wherein the inorganic oxide sputtering layer includes silicon oxide, aluminum oxide, titanium oxide, or a mixture thereof.

12. The plastic film according to claim 2, further comprises a second hard coating layer formed on an opposite surface of the substrate on which the first hard coating layer is formed and including a cured product of a multifunctional acrylate-based binder and a multifunctional urethane acrylate-based binder.

13. The plastic film according to claim 12, wherein the first hard coating layer and the second hard coating layer are each independently the same as or different from each other, and wherein the second hard coating layer includes a cross-linked copolymer of a 3-to 6-functional acrylate-based binder and a 7- to 20-functional urethane acrylate-based binder.

14. The plastic film according to claim 13, wherein the 7- to 20-functional urethane acrylate-based binder in the second hard coating layer includes a 7-to 9-functional urethane acrylate-based binder and a 10- to 20-functional urethane acrylate-based binder.

15. The plastic film according to claim 13, wherein the 3- to 6-functional acrylate-based binder has an acrylate equivalent weight of 50 to 300 g/mol.

16. The plastic film according to claim 13, wherein the 3- to 6-functional acrylate-based binders includes at least one selected from the group consisting of trimethylolpropane triacrylate (TMPTA), trimethylolpropaneethoxy triacrylate (TMPEOTA), glycerin propoxylated triacrylate (GPTA), pentaerythritol tetraacrylate (PETA), and dipentaerythritol hexaacrylate (DPHA).

17. The plastic film according to claim 13, wherein the 7- to 20-functional urethane acrylate-based binder has an acrylate equivalent weight of 200 to 1,500 g/mol.

18. The plastic film according to claim 2, wherein the plastic film exhibits a pencil hardness of 1H or more under a load of 750 g.

* * * * *